United States Patent

Zaluska et al.

[11] Patent Number: 5,882,623
[45] Date of Patent: Mar. 16, 1999

[54] METHOD FOR INDUCING HYDROGEN DESORPTION FROM A METAL HYDRIDE

[75] Inventors: Alicja Zaluska; Leszek Zaluski, both of Montreal; John Strom-Olsen, Westmount; Robert Schulz, Sainte-Julie, all of Canada

[73] Assignees: Hydro Quebec; McGill University, both of Montreal, Canada

[21] Appl. No.: 645,352

[22] Filed: May 13, 1996

[51] Int. Cl.[6] .......................................... C01B 3/04
[52] U.S. Cl. ....................... 423/648.1; 241/30; 423/658.2
[58] Field of Search .............................. 423/658.2, 648.1; 241/30

[56] References Cited

U.S. PATENT DOCUMENTS

| | | | |
|---|---|---|---|
| 3,676,071 | 7/1972 | Speed | 423/658.2 |
| 4,300,946 | 11/1981 | Simons | 423/658.2 |
| 4,304,593 | 12/1981 | Maeland | 423/658.2 |
| 4,383,606 | 5/1983 | Hunter | 206/0.7 |
| 5,360,461 | 11/1994 | Meinzer | 423/658.2 |

FOREIGN PATENT DOCUMENTS

| | | | |
|---|---|---|---|
| 0 088 649 A | 9/1983 | European Pat. Off. | |
| 1 568 374 A | 5/1980 | United Kingdom . | |
| 2067983 | 8/1981 | United Kingdom | 423/658.2 |
| 2 164 637 A | 3/1986 | United Kingdom . | |

*Primary Examiner*—Wayne Langel
*Attorney, Agent, or Firm*—Foley & Lardner

[57] ABSTRACT

Disclosed is a method for inducing desorption of hydrogen for a metal hydride by applying thereto sufficient energy to induce hydrogen desorption by endothermic reaction. The energy that is so-applied is non-thermal and selected from the group consisting of mechanical energy, ultrasonic energy, microwave energy, electric energy, chemical energy and radiation energy.

4 Claims, 2 Drawing Sheets

METHOD FOR INDUCING HYDROGEN DESORPTION FROM A METAL HYDRIDE

BACKGROUND OF THE INVENTION a) Field of the Invention

The present invention relates to a method for inducing desorption of hydrogen from a metal hydride containing the same, in which a non-thermal energy source is used to induce such desorption.

b) Brief Description of the Prior Art

Metal hydrides are potentially ideal candidates for hydrogen storage and transportation. As hydrogen carriers, they provide high hydrogen storage capacities (up to for example 7.6 wt. % in $Mg_2H_2$) and full safety. The safety is provided by endothermic reaction of hydrogen release, which excludes spontaneous (explosive) or uncontrolled reaction.

Metal hydrides are advantageous in that they can be handled and stored at ambient temperature without any atmosphere or pressure requirements. Such makes them economically favorable by elimination of cryogenic equipment necessary to use with liquid hydrogen or activated charcoal.

Metal hydrides are also very stable. Such is advantageous from a safety and economical point of view. However, because of their stability, most of the metal hydrides require elevated temperatures to initiate desorption.

Examples of metal hydrides having a high stability are $MgH_2$ or $Mg_2NiH_4$. They exhibit excellent hydrogen storage potential—with large hydrogen storage capacity (7.65 wt. % for $MgH_2$ or 3.6 wt. % for $Mg_2NiH_4$), low cost of the material and easy handling. However, desorption of hydrogen from these hydrides with reasonable kinetics requires heating to high temperatures: 350°–400° C. for $MgH_2$ and 330°–360° C. for $Mg_2NiH_4$.

For many applications, heating to such temperatures is disadvantageous. Indeed, it increases technical problems of hydrogen recovery and reduces effectiveness of the devices.

To solve this problem, it has already been suggested to reduce the stability of high temperature metal hydrides. Such may be obtained by alloying the metal hydrides with other elements. However, stability reduction occurs at the expense of the total hydrogen capacity.

OBJECT AND SUMMARY OF THE INVENTION

The object of the present invention is to provide an alternative approach to facilitate desorption of hydrogen from a high temperature metal hydride.

More particularly, the invention is based on the discovery that, instead of using a conventional heat source, use can be made of a non-thermal energy source to initiate hydrogen release and thus to induce hydrogen desorption.

The expression "non-thermal energy sources" as used in the present specification and claims does not necessary exclude energy sources where heat is produced, like electric energy where heat is produced by Joule effect. As a matter of fact, this expression is exclusively used to exclude "conventional" heat sources such as gas or oil burners where heat is produced and transferred mainly by convection to the metal hydrides.

Examples of non-thermal energy sources that can be used in accordance with the invention for releasing hydrogen from metal hydrides include:

1. microwave energy,
2. electric energy,
3. chemical energy,
4. mechanical energy,
5. ultrasonic energy, and
6. radiation.

Thus, the present invention as broadly claimed hereinafter, is directed to a method for inducing desorption of hydrogen from a metal hydride by applying thereto sufficient energy to induce hydrogen desorption by endothermic reaction, wherein the energy that is so applied is non-thermal and selected from the group consisting of mechanical energy, ultrasonic energy, microwave energy, electric energy, chemical energy and radiation energy.

The invention and its advantages will be better understood upon reading the following, non-restrictive description and examples.

DETAILED DESCRIPTION OF THE INVENTION

As aforesaid, the invention is based on the discovery that instead of using a heat source as it has been done so far, use can be made of a non-thermal energy source to induce hydrogen desorption from a metal hydride.

Thus, instead of using heat energy to raise the temperature of the environment of the hydride in order to induce the endothermal reaction of desorption of hydrogen from the same, energy is supplied to the hydride either intrinsically and on a local scale.

This energy may be applied directly on the metal hydride, or indirectly on an energy-carrier medium located in the proximity of the hydride.

Depending on the selected energy source, there are two ways of applying the energy to the hydride. The first one consists of inducing the desorption process by intrinsically heating the hydride (or the heating medium). Such is achieved when use is made of microwave energy, chemical energy where heat is generated by a chemical reaction, or electric energy where heat is generated by Joule effect. The other way consists of introducing and accumulating energy in the hydride to cause desorption, for example by mechanical energy (in the form of strain and defects) or by radiation energy. In this particular case, desorption is much easier than when the hydride is activated by heat. Moreover, after mechanical or radiation pretreatment, the desorption temperature is significantly reduced.

The way each of the above mentioned, alternative energy sources can be used will now be explained in greater details.

1. Microwave energy

In accordance with the invention, microwave energy can be directly applied onto the hydride or on a suitable medium intermixed with the hydride to allow for local release of hydrogen, without heating the whole system and under controlled conditions. This method provides high efficiency of desorption, which occurs at temperatures lower than those achieved under conventional heating conditions, due to an excitation by the microwaves of the bonds in the hydride.

The desorption may be conducted in two ways. The first one of these ways consists of using microwaves to achieve release of the whole hydrogen content. The other way consists in using microwave treatment just to initialize the desorption process which then can be continued by conventional heating at lower temperatures and in a much easier way than when heated in a conventional way.

2. Electric energy

Another method to induce hydrogen desorption consists in heating the hydride by means of an electric resistance embedded into the same. The energy of the current flowing into the resistance is converted into heat by Joule effect. The amount of heat created locally by the current flow is particularly high in the case of compressed powder material, with hot spots on the current paths between powder particles, where resistivity is very high. In extreme cases, powder welding may occur at the hot spots. Therefore, the current parameters should be adjusted properly to avoid sintering. Depending on the particular conditions of the process, the hydrides may be heated directly, or with the use of the current carrier medium.

3. Chemical energy

Another method to reduce hydrogen desorption consists of mixing fine particles of the metal hydrides with an appropriate amount of a substance that decomposes spontaneously under exothermic conditions at a desirable temperature range (for example 50°–100° C.), or with a mixture of products that exothermically react with each other to produce a large amount of heat.

4. Mechanical energy

Another method of inducing hydrogen desorption from a metal hydride consists of applying mechanical energy by ball milling to a powder of the metal hydride (which is the usual form of metal hydride). It is well established that ball milling is capable of generating a sufficient amount of mechanical energy to cause formation of various compounds (nitrides, borides,) or alloys (mechanical alloying). In the present case, ball milling can be used either to decompose the metal hydride and release hydrogen, or to accumulate so much strain and defects in the hydride that further heat-activated desorption is facilitated. Temperature of desorption of metal hydrides treated mechanically may be then reduced by 100°–200° C., which is of great significance for practical application.

5. Ultrasonic energy

Another method of inducing hydrogen description consists in applying ultrasonic energy to the metal hydride. By using a liquid such as water or alcohol as an energy carrier medium, it is possible to generate shock waves and localized heating by acoustic cavitation, with formation of hot spots reaching a temperature as high as 5000° K (in the case of extremely high-intensity ultrasound sources) over periods of less than 1 microsecond.

Thus, sonochemistry, which is already successfully used for the thermal synthesis of amorphous metals or nano-scaled catalysts from volatile organometallics, may be adapted for hydrogen desorption from metal hydrides. The hydride powder immersed in a liquid medium acting as an energy carrier and subjected to ultrasound of adjusted intensity, decomposites at hot spots created by acoustic cavitation and releases hydrogen, without significant increase of the total temperature of the system. It provides an easy and efficient hydrogen desorption.

6. Radiation energy

Desorption of hydrogen from metal hydrides can also be induced by using radiation energy produced by high intensity light sources, ion sources, lasers and the like.

The method according to the invention has numerous practical applications. Some of the proposed energy sources, like the microwave and electric energies, do not affect the structure of the metal hydride and the reversibility of the hydrogen absorption/desorption. Thus, it can be used to initiate hydrogen desorption in rechargeable hydrogen storage tank, to start hydrogen-fuelled engine or vehicle. In this connection, reference can be made to U.S. patent application Ser. No. 8/587,588 filed on Jan. 19, 1996 in the name of the same Applicants, pending, which is hereby incorporated by reference.

Other energy sources like chemical and mechanical energies, affect the structure of metal hydride. In such a case, the method according to the invention may be used for inducing hydrogen desorption in disposable hydrogen storage tanks (for camping units or similar use).

Further energy sources like microwave and radiation energies are rather expensive and need substantial equipments. In such case, the method according to the invention can be used in power systems or units, where a large amount of hydrogen is needed rapidly.

EXAMPLE 1

Microwave Energy

Figure 1:
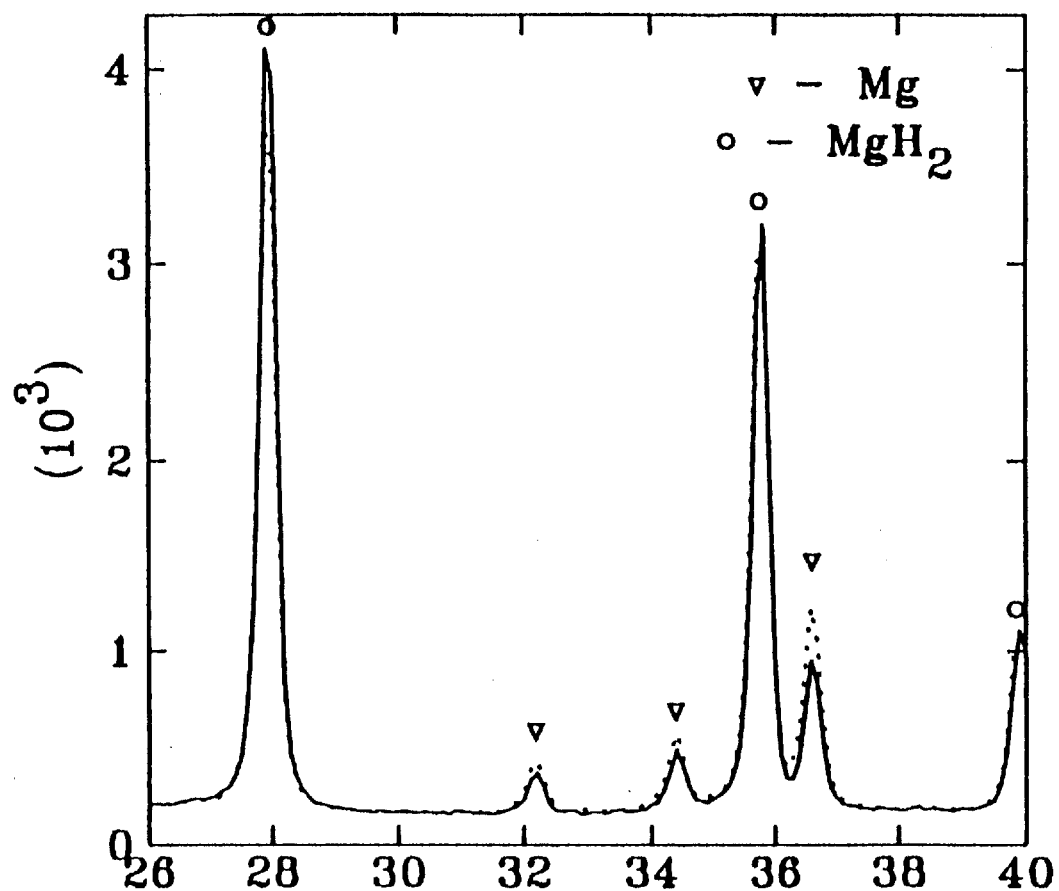
FIG. 1 is a curve showing the change of X-ray diffraction pattern of a Mg-hydride powder heated at time intervals of 1 minute in a microwave unit (the plain line shows the diffraction before heating, the dotted line after heating)

A powder of a Mg-based hydride was heated in a microwave unit. Samples were examined after successive heating for the time intervals of 1 minute. X-ray diffraction for this series of samples showed consecutive disappearance of the hydride reflections from the diffraction pattern and increase of the pattern of metal reflections, which is indicative of decomposition of the metal hydride (FIG. 1).

This test also showed that a very short heating time (less than 1 minute) does not release significant amount of hydrogen, but causes a substantial reduction in the desorption temperature, as demonstrated by DSC measurements.

EXAMPLE 2

Chemical Energy

A powder of the Mg-based hydride was mixed with a small amount of a powder of lithium aluminum hydride ($LiAlH_4$). Addition of an appropriate amount of water (moisture) caused a rapid and exothermic reaction according to the following equation:

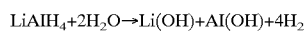

$$LiAlH_4 + 2H_2O \rightarrow Li(OH) + Al(OH) + 4H_2$$

This reaction released a large amount of heat ($109 \pm 4.2$ kJ/mol$H_2$), which caused desorption of hydrogen from the Mg-based hydride.

EXAMPLE 3

Mechanical Energy

Figure 2:
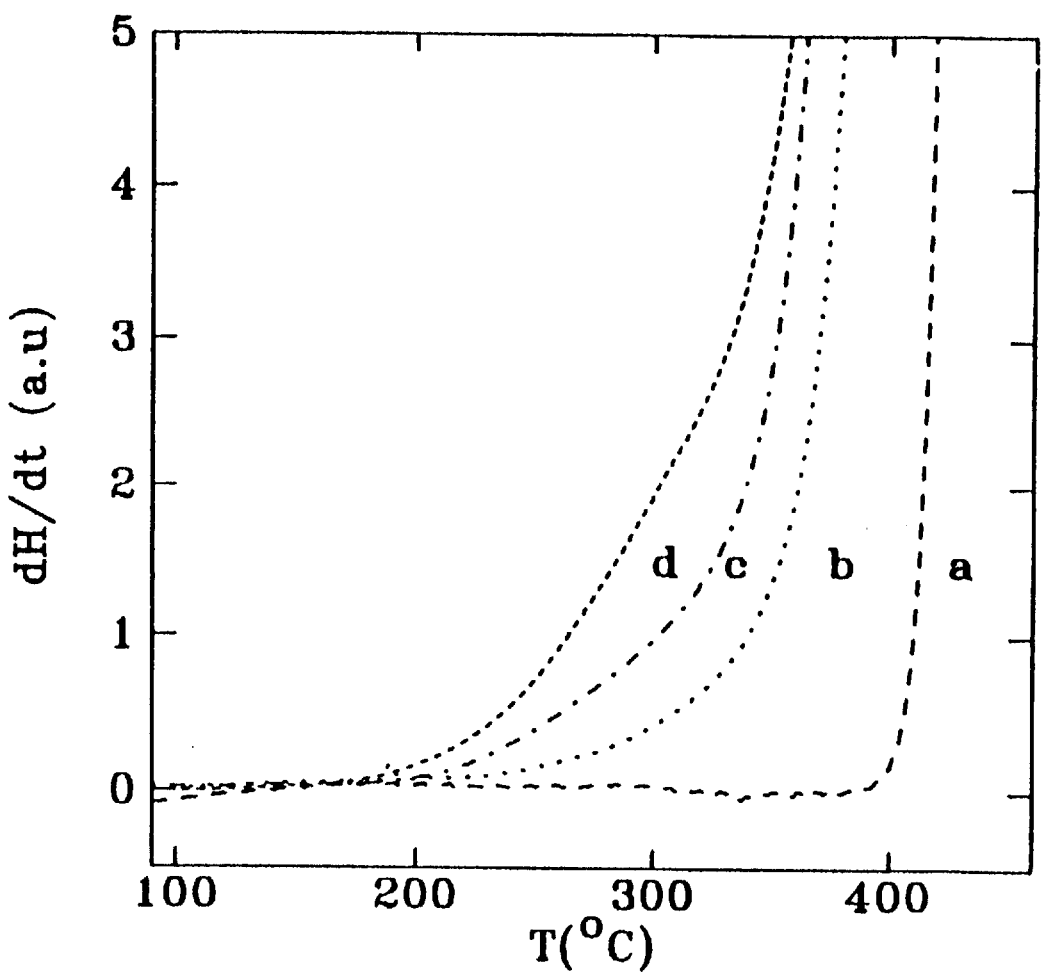
FIG. 2 are differential scanning calorimetry (DSC) curves of a Mg-based hydride as prepared (a) and after 2, 7 and 9 minutes of ball milling (curves (b), (c) and (d), respectively).

A Mg-based hydride was submitted to a mechanical pretreatment before desorption. In the as-prepared state, it exhibited a high temperature of desorption equal to about 400° C., when measured by differential scanning calorimetry (DSC) at continuous heating with heating rate of 40 K/min (see FIG. 2, curve a). Ball milling in a SPEX® mill caused a decrease in the desorption temperature due to an accumulation of mechanical energy in the form of strain and defects. Curves b, c and d represent effects of ball milling of the hydride for 2, 7, 9 min., respectively. The temperature of desorption was decreased by 200° C. in the last case (see FIG. 2).

EXAMPLE 4

Ultrasonic Energy

A powder of Mg-based hydride was placed in an ultrasonic water bath. The container with the hydride was connected by a capillary tube to the water bath outside the ultrasonic device. During ultrasonic treatment, large gas bubbles appeared in the water bath at the end of the capillary indicating hydrogen release from the hydride. Both X-ray diffraction and DSC measurements of the hydride after ultrasonic treatment showed that desorption of hydrogen occurred.

What is claimed is:

1. A method for inducing desorption of hydrogen from a high temperature metal hydride, comprising the step of exclusively applying the said metal hydride sufficient energy to induce hydrogen desorption by endothermic reaction wherein said energy is mechanical energy and is applied to said metal hydride by subjecting said metal hydride to a high energy mechanical grinding.

2. The method of claim 1, wherein the mechanical energy is used exclusively to induce the hydrogen desorption which is subsequently completed by thermal heating.

3. The method of clam 1, wherein the metal hydride is selected from the group comprising of $MgH_2$ and $Mg_2NiH_4$.

4. The method of claim 2, wherein tie metal hydride is selected from the group consisting of $MgH_2$ and $Mg_2NiH_4$.

* * * * *